US012672196B2

(12) United States Patent　　　　(10) Patent No.:　US 12,672,196 B2
Josefiak et al.　　　　　　　　　　　　(45) Date of Patent:　　Jun. 30, 2026

(54) SYSTEMS AND METHODS FOR RADIO CONFIGURATION AND VALIDATION

(71) Applicant: L3Harris Global Communications, Inc., Melbourne, FL (US)

(72) Inventors: Brent Josefiak, Rochester, NY (US); Daniel Harris, Rochester, NY (US)

(73) Assignee: L3Harris Global Communications, Inc., Melbourne, FL (US)

( * ) Notice: Subject to any disclaimer, the term of this patent is extended or adjusted under 35 U.S.C. 154(b) by 260 days.

(21) Appl. No.: 18/674,106

(22) Filed: May 24, 2024

(65) Prior Publication Data

US 2025/0365801 A1　　　Nov. 27, 2025

(51) Int. Cl.
*H04W 76/20*　　　　(2018.01)

(52) U.S. Cl.
CPC ................................... *H04W 76/20* (2018.02)

(58) Field of Classification Search
None
See application file for complete search history.

(56) References Cited

U.S. PATENT DOCUMENTS

2008/0045169 A1　2/2008　Zetzl et al.
2013/0272134 A1　10/2013　Miller et al.

2015/0088674 A1　3/2015　Flurscheim et al.
2018/0092086 A1*　3/2018　Nammi ............. H04L 27/26025
2021/0399868 A1*　12/2021　Chen ..................... H04L 7/0016
2022/0338293 A1*　10/2022　Yu ........................ H04W 72/044
2024/0045500 A1　2/2024　Rubin et al.
2024/0046747 A1　2/2024　Nelson et al.
2024/0048379 A1　2/2024　Melzer

FOREIGN PATENT DOCUMENTS

CN　　111709501　　9/2020
EP　　3425894　　1/2019
JP　　6701364　　5/2020

* cited by examiner

*Primary Examiner* — Diane L Lo
(74) *Attorney, Agent, or Firm* — Fox Rothschild LLP; Carol E. Thorstad-Forsyth

(57)　　　　　　ABSTRACT

Systems and methods for re-configuring radios. The methods comprise: obtaining a machine-readable code by a mobile communication device from a first radio of the plurality of radios, the machine-readable code based on first digital configuration data for the first radio, the digital configuration data comprising at least one of an operational frequency, a time, a bandwidth, modulation coding data, forward error correction data, differential encoding data, cypher mode, a TRANSEC key, security key identifier, and a spreading code; and updating, by the mobile communication device, a second digital configuration data of a second radio communicatively coupled to the mobile communication device based on the first digital configuration data.

18 Claims, 7 Drawing Sheets

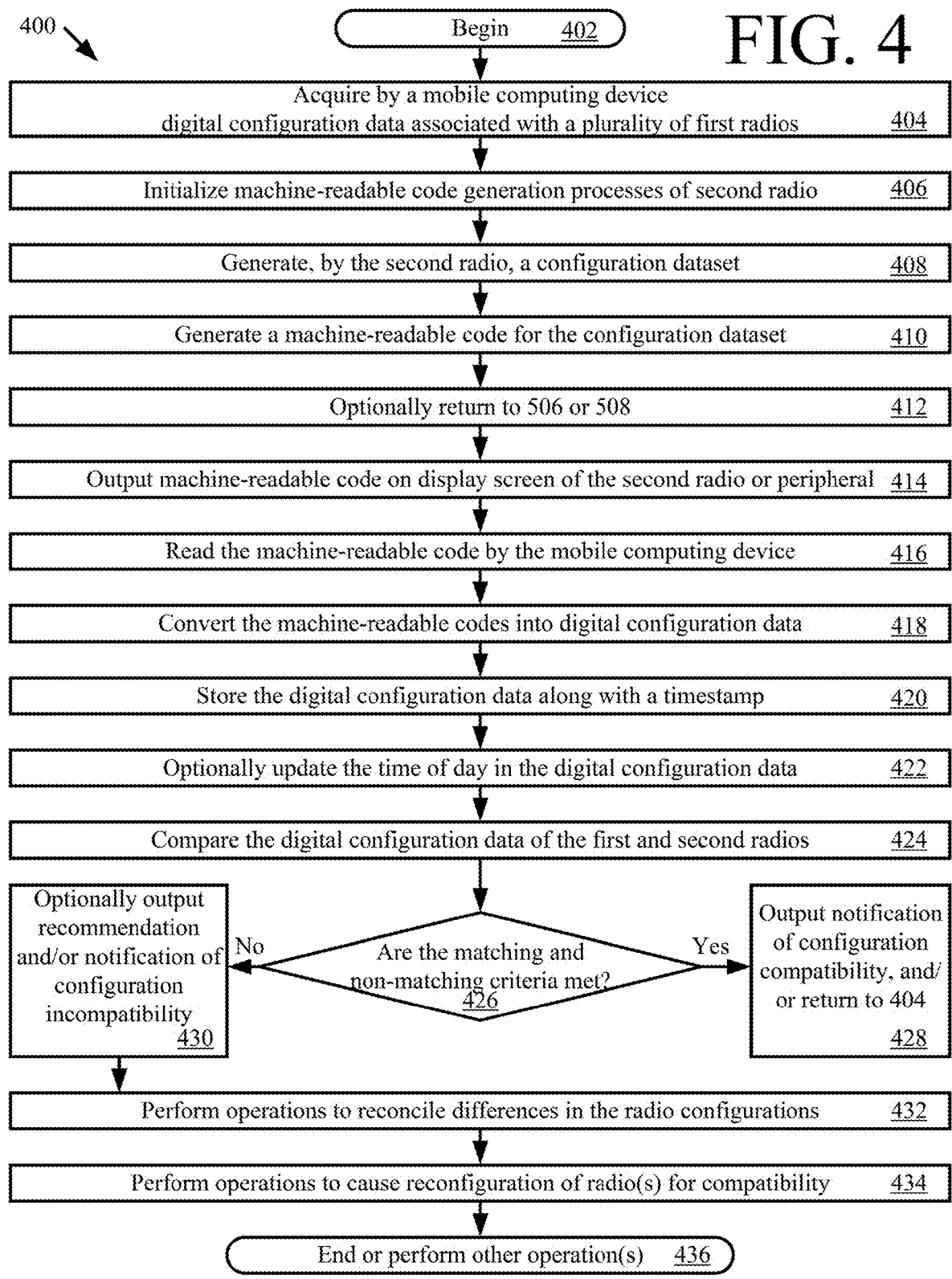

400

Begin          402

FIG. 4

Acquire by a mobile computing device
digital configuration data associated with a plurality of first radios          404

Initialize machine-readable code generation processes of second radio          406

Generate, by the second radio, a configuration dataset          408

Generate a machine-readable code for the configuration dataset          410

Optionally return to 506 or 508          412

Output machine-readable code on display screen of the second radio or peripheral          414

Read the machine-readable code by the mobile computing device          416

Convert the machine-readable codes into digital configuration data          418

Store the digital configuration data along with a timestamp          420

Optionally update the time of day in the digital configuration data          422

Compare the digital configuration data of the first and second radios          424

Optionally output
recommendation
and/or notification of
configuration
incompatibility
430

No

Are the matching and
non-matching criteria met?
426

Yes

Output notification
of configuration
compatibility, and/
or return to 404
428

Perform operations to reconcile differences in the radio configurations          432

Perform operations to cause reconfiguration of radio(s) for compatibility          434

End or perform other operation(s)          436

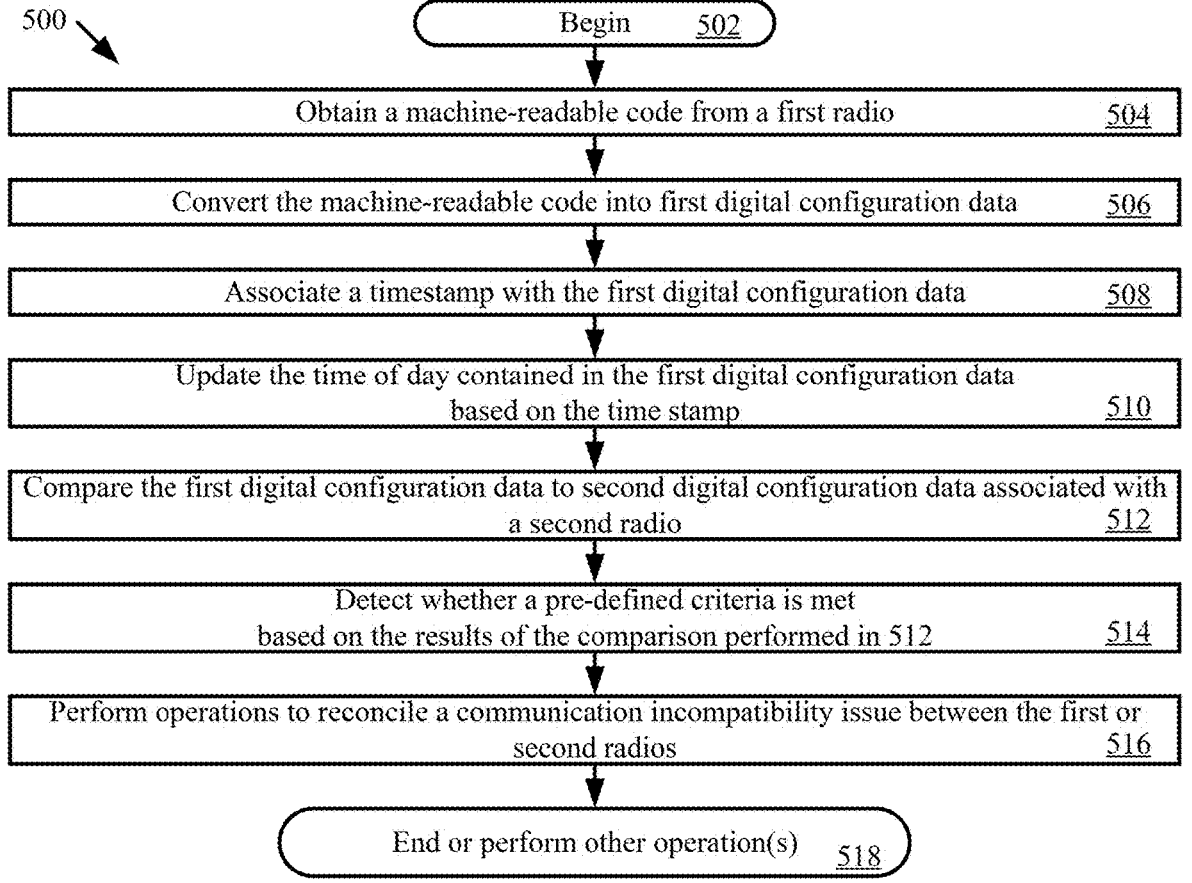

500

Begin       502

Obtain a machine-readable code from a first radio                              504

Convert the machine-readable code into first digital configuration data          506

Associate a timestamp with the first digital configuration data                  508

Update the time of day contained in the first digital configuration data
based on the time stamp                                                         510

Compare the first digital configuration data to second digital configuration data associated with
a second radio                                                                 512

Detect whether a pre-defined criteria is met
based on the results of the comparison performed in 512                          514

Perform operations to reconcile a communication incompatibility issue between the first or
second radios                                                                  516

End or perform other operation(s)       518

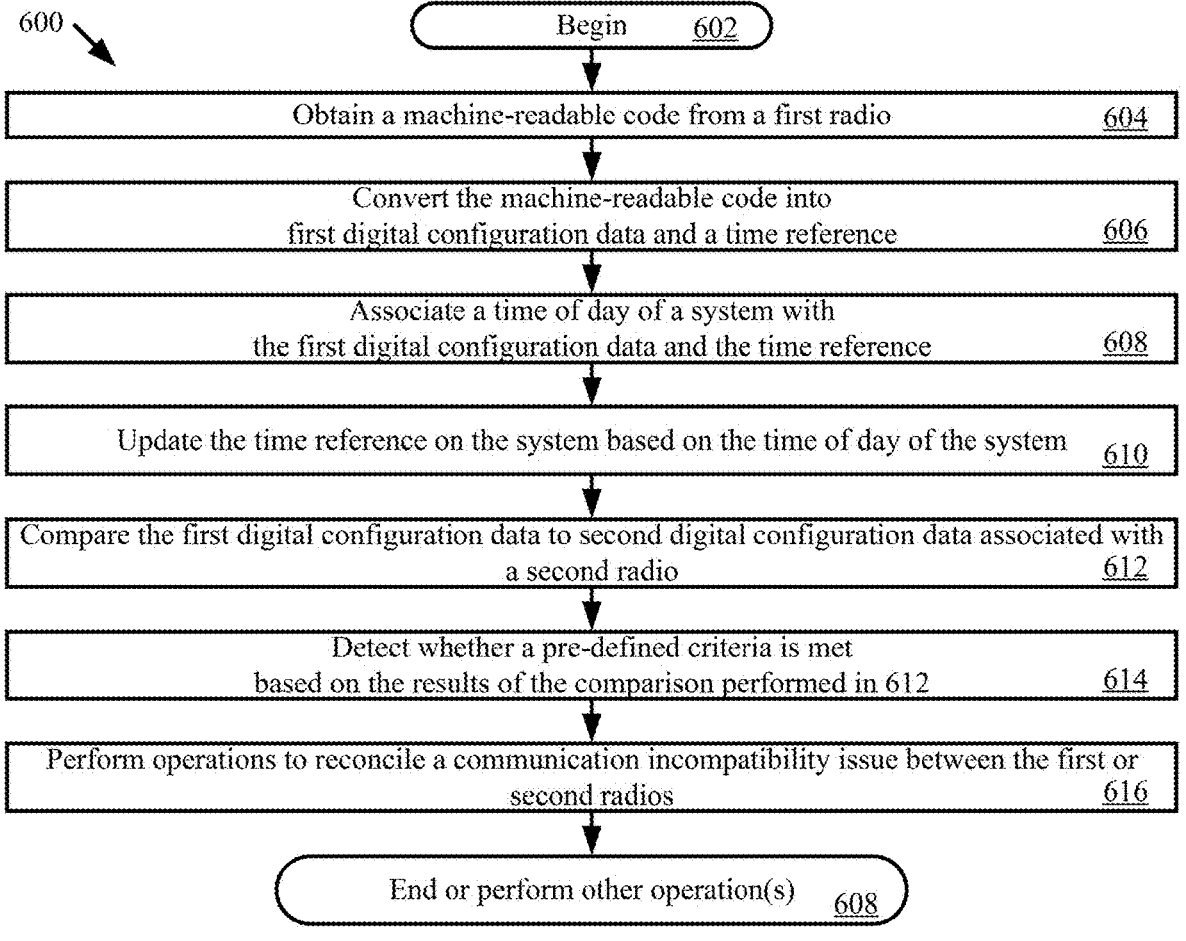

Begin          602

Obtain a machine-readable code from a first radio          604

Convert the machine-readable code into
first digital configuration data and a time reference          606

Associate a time of day of a system with
the first digital configuration data and the time reference          608

Update the time reference on the system based on the time of day of the system          610

Compare the first digital configuration data to second digital configuration data associated with
a second radio          612

Detect whether a pre-defined criteria is met
based on the results of the comparison performed in 612          614

Perform operations to reconcile a communication incompatibility issue between the first or
second radios          616

End or perform other operation(s)          608

Begin        702

Obtain a machine-readable code from a first radio        704

Update a second digital configuration data of a second radio communicatively coupled to the mobile communication device based on the first digital configuration data        706

End or perform other operation(s)        708

SYSTEMS AND METHODS FOR RADIO CONFIGURATION AND VALIDATION

BACKGROUND

Description of the Related Art

Radio configuration is increasingly complex and frequently requires multiple configuration items for waveform, radio, security and peripherals. The radio configuration complexity limits the ability to find and/or fix software errors in the field.

SUMMARY

The present disclosure concerns implementing systems and methods for (re-) configuring at least one of a plurality of radios. The methods comprise: obtaining a machine-readable code by a mobile communication device from a first radio of the plurality of radios, the machine-readable code based on first digital configuration data for the first radio (wherein the first digital configuration data comprises at least one of an operational frequency, a time, a bandwidth, modulation coding data, forward error correction data, differential encoding data, cypher mode, a TRANSEC key, security key identifier, and a spreading code); and updating, by the mobile communication device, a second digital configuration data of a second radio communicatively coupled to the mobile communication device based on the first digital configuration data.

The present disclosure concerns a system comprising a processor; and a non-transitory computer-readable storage medium comprising programming instructions that are configured to cause the processor to implement a method for re-configuring at least one of a plurality of radios in the field. The programming instructions comprise instructions to: obtain a machine-readable code from a first radio of the plurality of radios, the machine-readable code based on first digital configuration data for the first radio (wherein the first digital configuration data comprising at least one of an operational frequency, a time, a bandwidth, modulation coding data, forward error correction data, differential encoding data, cypher mode, a TRANSEC key, security key identifier, and a spreading code); and update a second digital configuration data of a second radio communicatively coupled to the mobile communication device based on the first digital configuration data.

BRIEF DESCRIPTION OF THE DRAWINGS

The present solution will be described with reference to the following drawing figures, in which like numerals represent like items throughout the figures.

FIG. 4 provide a flow diagram of an illustrative method for managing radio configurations in the field.

FIG. 5 provides a flow diagram of an illustrative method for configuring or re-configuring at least one of a plurality of radios.

FIG. 6 provides a flow diagram of another illustrative method for configuring or re-configuring at least one of a plurality of radios.

DETAILED DESCRIPTION

As noted above, radio configuration complexity limits the ability to find and/or fix misconfiguration issues in the field. For example, there are scenarios in which radio users are not pre-planned to communicate with each other, but need to communicate with one another in the field. Manual reconfiguration of the radios is often performed in these scenarios. However, manual radio reconfiguration is error prone due at least partially to a lack of troubleshooting time, troubleshooting training, or trouble shooting equipment by the radio users of how to properly diagnose whether an interoperability issue is hardware related or configuration related.

In conventional systems, radio configurations are generated for a group of radios at a personal computer or cloud application, and then loaded via a universal serial bus (USB) mass storage device into the radios present at a common location. The radio configurations are activated by user-software interactions via radio front panel(s) and/or input device(s) of terminal(s). Network interoperability is typically validated by having each radio user to turn on the radios and perform a voice communication check between participating radios, before leaving a common location.

When radio configuration issues occur after the radio leaves the common location, the radio users simply turn the radios on and off or reactivate the radio configuration. Beyond this, expertise and training is required to diagnose configuration issues in the field. Particularly, synchronization components may need to be coordinated across radios. Outside time sources may not be suitable to rely on for such synchronization. This often results in radio users manually setting the time of day in the radios to match a time of day of one of the radio selected to be a master radio. This manual time updating process is time consuming and error prone.

One solution to solve these issues may be to compare configuration data of the radios. However, there is no easy way to compare the configurations of multiple radios to identify differences therein. Also, there is a limited ability to rapidly share configurations between radios in the field (without a common preset). Even if configuration of multiple radios are shared amongst users, the users may manually change radio configurations that do not meet certain criteria. For example, the users may reconfigure the radios to use plain text instead of cipher text. Thus, there is a need for an improved process to reconfigure radios in the field in a less complex, time consuming, and error prone manner. The present solution provides such an improved process.

Figure 1:
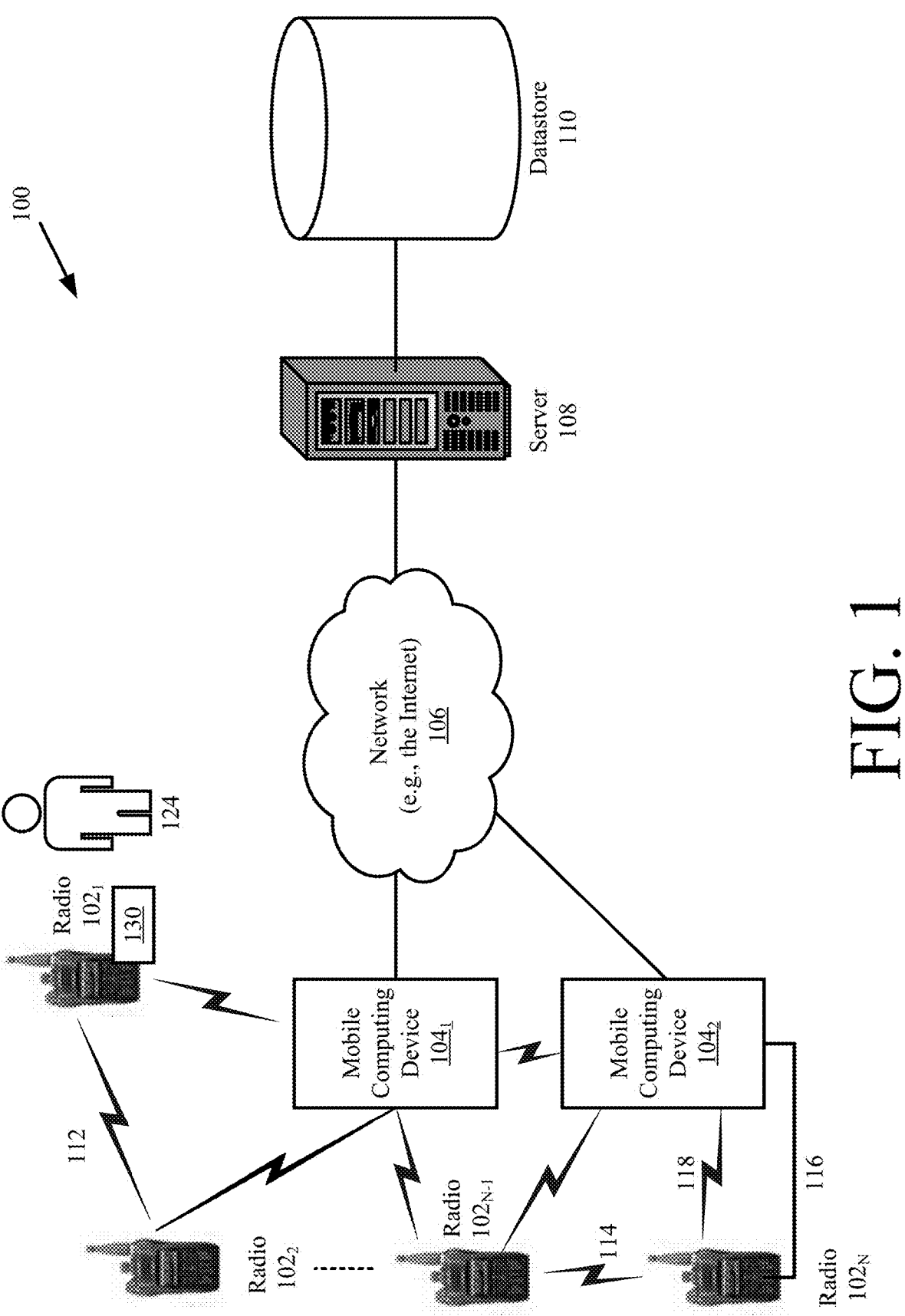
FIG. 1 is a perspective view of an illustrative system.

FIG. 1 provides an illustration of a system 100 configured to manage operations of field personnel member(s) 124 of an organization. The field personnel members may be assigned to radio configuration. Each field personnel member is assigned and provided a radio 102₁, 102₂, . . . , 102_N (collectively referred to as "102"). Each radio 102₁, 102₂, . . . , 102_N is configured to provide communication with other radios in its talk group via wireless communications. For example, radios 102₁ and 102₂ are associated with a first talk group and radios 102_{N-1} and 102_N are associated with a second talk group. Thus, radios 102₁ and 102₂ are preconfigured or configured to communicate with each other over wireless communication links 112, while radios 102_{N-1} and 102_N are preconfigured or configured to communicate with each other over wireless communication links 114. Radios 102_{N-1} and 102_N are communicatively incompatible with radios $102_1$ and $102_2$. It may become desirable to reconfigure the radios of the second talk group to be able to communicate with the radios of the first talk group when in the field (or vice versa). In order to do this, the configuration settings of the radios $102_1/102_2$ and/or $102_{N-1}/102_N$ would need to be changed to make the radios $102_{N-1}$ and $102_N$ communicatively compatible with the radios $102_1$ and $102_2$.

Mobile communication devices $104_1$, $104_2$ (collectively referred to as "104") are provided to facilitate the in-field reconfiguration of the radios for communication compatibility. The mobile communication devices $104_1$, $104_2$ can include, but are not limited to, a radio, a mobile phone, a smart phone, a portable computer, and/or a tablet computer. The mobile communication device(s) can include integrated camera(s). The manner in which the in-field radio configuration and/or reconfiguration is achieved will become evident as the discussion progresses. However, it should be understood that the mobile communication devices $104_1$, $104_2$ are generally configured to obtain configuration data from the radios $102_1$-$102_N$, compare the configuration data to each other, and cause a reconfiguration of one or more radios in the field based on result of the comparisons. The mobile communication devices $104_1$, $104_2$ may store the configuration data in its local datastore(s) and/or communicate with one or more remote server(s) 108 via a network 106 (e.g., the Internet) for storing the configuration data in remote datastore(s) 110.

The mobile communication devices $104_1$, $104_2$ may communicate with the radios via wired connections 116 and/or wireless links 118. The wired connections 116 can include, but are not limited to, universal serial bus (USB) connections. The wireless links 118 may be implemented via long range communication (LRC) technology, near field communication (NFC) technology, and/or short range communication (SRC) technology. The listed communication technologies are well known.

Figure 2:
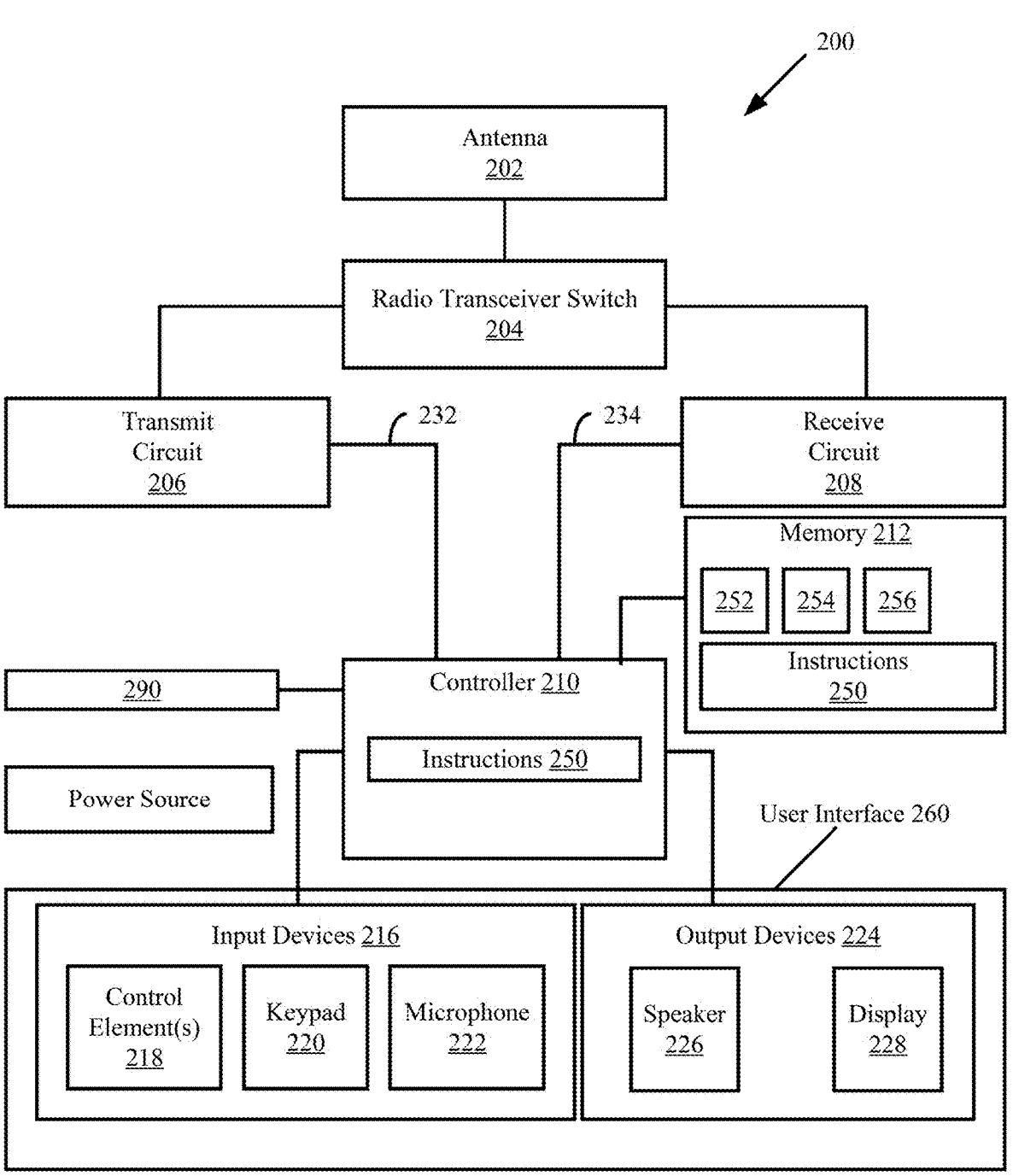
FIG. 2 is an illustration of an illustrative architecture for a radio.

FIG. 2 provides an illustration of an illustrative architecture for a radio 200. Radios $102_1$-$102_N$ of FIG. 1 are the same as or similar to radio 200. As such, the discussion of radio 200 is sufficient for understanding radios $102_1$-$102_N$ of FIG. 1. Radio 200 can include more or less components than that shown in FIG. 2 in accordance with a given application. However, the components shown are sufficient to disclose an illustrative hardware architecture implementing the present solution.

Radio 200 comprises an antenna 202 for receiving and transmitting Radio Frequency (RF) signals. A transceiver switch 204 selectively couples the antenna 202 to a transmit circuit 206 and a receive circuit 208 in a manner familiar to those skilled in the art. Transmit and receive circuits are well known in the art. Still, it should be understood that the transmit circuit 206 is configured to (i) cause information to be transmitted to an external device (e.g., radios 102 and/or mobile communication devices 104 of FIG. 1) and/or a network (e.g., network 106 of FIG. 1) via RF signals and (ii) process RF signals received from the external device and/or network to extract information therefrom. The transmit and receive circuits 206, 208 are coupled to a controller 210 via respective electrical connections 232, 234. In a transmit mode, the controller 210 also provides information to the transmit circuit 206 for encoding and modulating information into RF signals. The transmit circuit 206 communicates the RF signals to the antenna 202 for transmission to an external device. In a receive mode, the receive circuit 208 provides decoded RF signal information to the controller 210. The controller 210 uses the decoded RF signal information in accordance with the function(s) of the radio 200.

The controller 210 stores the decoded RF signal information in a memory 212 of the radio 200. Accordingly, the memory 212 is connected to and accessible by the controller 210 through an electrical connection 232. The memory 212 may be a volatile memory and/or a non-volatile memory. For example, the memory 212 can include, but is not limited to, a random access memory (RAM), a dynamic random access memory (DRAM), a static random access memory (SRAM), a read-only memory (ROM), and/or flash memory.

One or more sets of instructions 250 are stored in the memory 212. The instructions 250 can also reside, completely or at least partially, within the controller 210 during execution thereof by the radio 200. In this regard, the memory 212 and the controller 210 can constitute machine-readable media. The term "machine-readable media", as used here, refers to a single medium or multiple media that store the one or more sets of instructions 250. The term "machine-readable media", as used here, also refers to any medium that is capable of storing, encoding or carrying the set of instructions 250 for execution by the radio 200 and that cause the radio 200 to perform one or more of the methodologies of the present disclosure.

The controller 210 is also connected to a user interface 260. The user interface 260 comprises input devices 216, output devices 224, and software routines (not shown in FIG. 2) configured to allow a user to interact with and control software applications 252 installed on the radio 200. Such input and output devices respectively include, but are not limited to, a display 228, a speaker 226, a keypad 220, a directional pad (not shown in FIG. 2), a directional knob (not shown in FIG. 2), and a microphone 222. The display 228 may be designed to accept touch screen inputs. The input devices 216 also comprise control elements 218. The control elements 218 include, but are not limited to, an on/off switch or button, and/or volume control buttons.

Radio 200 may also comprise sensors 290. Sensor(s) 290 can include, but is(are) not limited to, environmental sensor(s) for detecting condition(s) of a surrounding environment and/or other sensor(s). The environmental sensor(s) can include, for example, humidity sensor(s), light detection sensor(s), temperature sensor(s), and/or terrain detection sensor(s). The other sensor(s) can include, for example, accelerometer(s), global positioning system (GPS) sensor(s), and/or proximity sensor(s). These sensor(s) 290 can be used to facilitate in-field re-configuration of radios. The manner in which these sensor(s) 290 are used will become evident as the discussion progresses.

Figure 3:
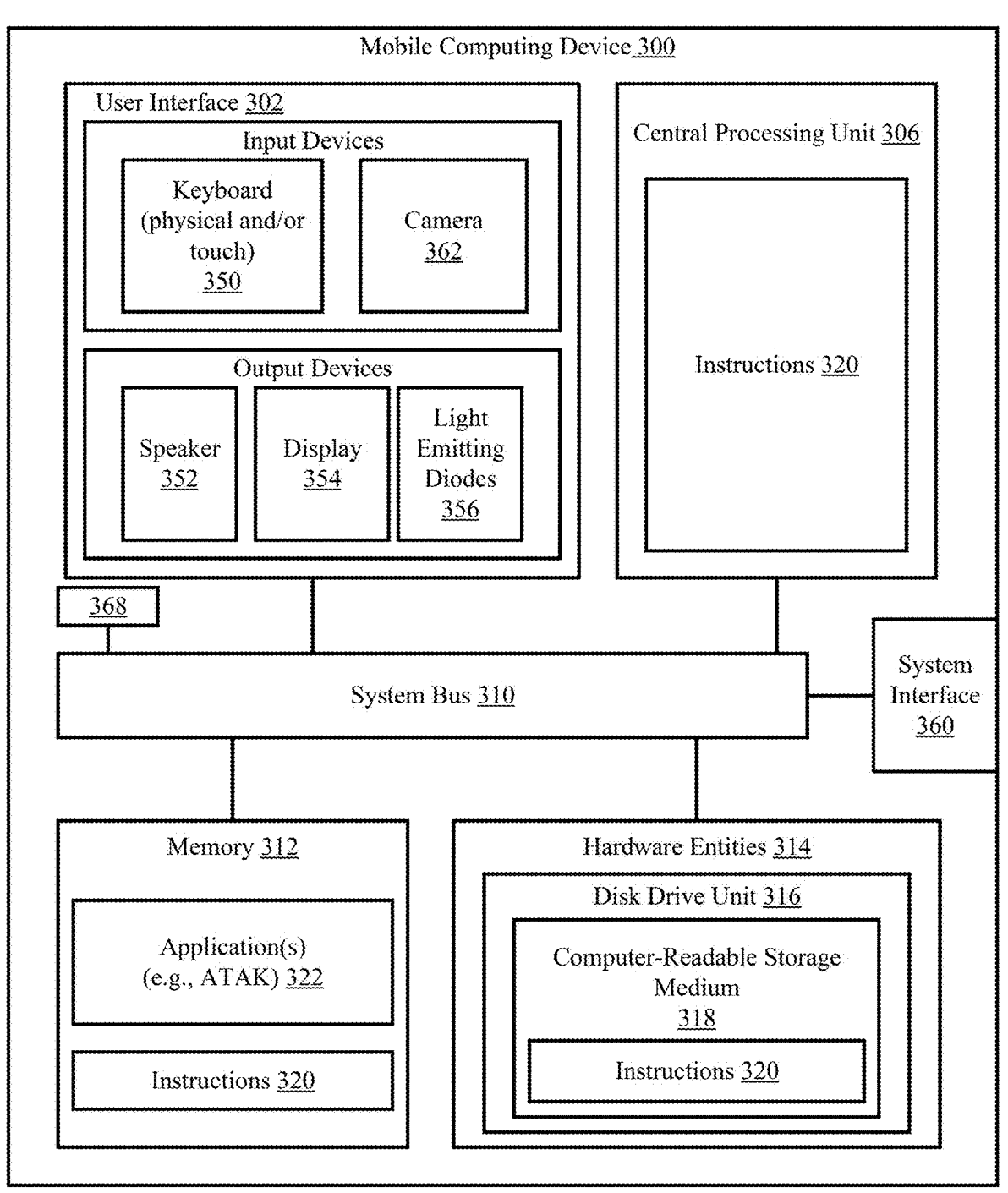
FIG. 3 is an illustration of an illustrative architecture for a mobile communication device.

FIG. 3 provides an illustration of an illustrative architecture for a computing device 300. Mobile computing devices 104 and/or server 108 of FIG. 1 is(are) the same as or similar to computing device 300. As such, the discussion of computing device 300 is sufficient for understanding these component of system 100.

Computing device 300 may include more or less components than those shown in FIG. 3. However, the components shown are sufficient to disclose an illustrative solution implementing the present solution. The hardware architecture of FIG. 3 represents one implementation of a representative computing device configured to provide an improved in-field radio configuration process, as described herein. As such, the computing device 300 of FIG. 3 implements at least a portion of the method(s) described herein.

Some or all components of the computing device 300 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

Computing device 300 comprises a user interface 302, a Central Processing Unit (CPU) 306, a system bus 310, a memory 312 connected to and accessible by other portions of computing device 300 through system bus 310, a system interface 360, sensor(s) 368 and hardware entities 314 connected to system bus 310. The user interface can include input devices and output devices, which facilitate user-software interactions for controlling operations of the computing device 400. The input devices may include, but are not limited, a physical and/or touch keyboard 350, a mouse, and/or a microphone. The input devices can be connected to the computing device 300 via a wired or wireless connection (e.g., a Bluetooth® connection). The output devices include, but are not limited to, a speaker 352, a display 354, and/or light emitting diodes 356. System interface 360 is configured to facilitate wired or wireless communications to and from external devices (e.g., network nodes such as access points, databases, etc.).

Sensor(s) 368 can include, but is not limited to, environmental sensors for detecting conditions of a surrounding environment and/or other sensors. The environmental sensors can include, for example, humidity sensor(s), light detection sensor(s), temperature sensor(s), and/or terrain detection sensor(s). The other sensor(s) can include, for example, accelerometer(s), global positioning system (GPS) sensor(s), and/or proximity sensor(s). These sensor(s) 368 can be used to facilitate in-field re-configuration of radios. The manner in which these sensor(s) 368 are used will become evident as the discussion progresses.

At least some of the hardware entities 314 perform actions involving access to and use of memory 312, which can be a RAM. Hardware entities 314 can include a disk drive unit 316 comprising a computer-readable storage medium 318 on which is stored one or more sets of instructions 320 (e.g., software code) configured to implement one or more of the methodologies, procedures, or functions described herein. The instructions 320 can also reside, completely or at least partially, within the memory 312 and/or within the CPU 306 during execution thereof by the computing device 300. The memory 312 and the CPU 306 also can constitute machine-readable media. The term "machine-readable media", as used here, refers to a single medium or multiple media (e.g., a centralized or distributed database, and/or associated caches and servers) that store the one or more sets of instructions 320. The term "machine-readable media", as used here, also refers to any medium that is capable of storing, encoding or carrying a set of instructions 320 for execution by the computing device 300 and that cause the computing device 300 to perform any one or more of the methodologies of the present disclosure.

Computing device 300 facilitates an improved in-field radio (re)configuration process. In this regard, computing device 300 runs one or more software applications 322 implementing the methods described herein. The software application can include, but is not limited to, an ATAK plugin configured to allow a user to initiate end-to-end encrypted communications directly from an ATAK interface.

Referring now to FIG. 4, there is provided a flow diagram of an illustrative method 400 for managing radio configurations in the field. Method 400 begins with 402 and continues with 404 where a first mobile computing device (e.g., mobile computing device 104₁ of FIG. 1) acquires digital configuration data associated with a plurality of first radios (e.g., radios 102₁, . . . , and/or 102_{N-1} of FIG. 1). This data acquisition can be achieved by SRCs between the first mobile computing device and the first radios. Each first radio is associated with a respective set of digital configuration data. The set of digital configuration data can include, but is not limited to, radio identification, pre-set system settings, pre-set waveform settings, and/or time of day. System settings and waveform settings for radios are well known. The system settings can include, but are not limited to, a frequency setting, a communication mode, a channel, a channel width, a transmit power, threshold(s), encryption algorithm name, and/or key index(es). The waveform settings can include, but are not limited to, waveform name, waveform type, waveform length, carrier state(s), modulation type, and/or frequency hopping information.

At some later time, a machine-readable code generation process is initialized, enabled or otherwise started for a second radio (e.g., radio 102_N of FIG. 1) as shown by block 406. Initialization, enablement and/or starting of the machine-readable code generation process may occur in response to a trigger event. The trigger event can include, but is not limited to, a user-software interaction with the second radio, a user-software interaction with the first mobile computing device, detection of a wired connection between the first mobile computing device and the second radio, the second radio's reception of a message from the first mobile computing device, a change of a configuration setting for the second radio, launch of a software application on the second radio or first mobile communication device, and/or expiration of a defined time period. The defined time period may be one to M seconds, minutes, hours or days. M is an integer.

Next in block 408, the second radio performs operations of generate a configuration dataset. The configuration dataset includes a radio identification, pre-set system settings, pre-set waveform settings, and/or time of day. Pre-set system settings and pre-set waveform settings are well known. The pre-set system settings and pre-set waveform settings may be encapsulated with a header and/or a footer including the radio identification and the time of day. The configuration dataset is in a first machine-readable data format that can be understood by other radios. The first machine-readable data format may comprise a digital data format or an alpha-numeric format. In the alpha-numeric case, the first machine-readable data format may be a human-readable format in addition to being machine-readable.

In block 410, the second radio performs operations to translate or otherwise change the data format of the configuration dataset from the first machine-readable data format to a different second machine-readable data format suitable for NFCs and/or SRCs between the second radio and mobile computing devices. The second machine-readable data format can include a machine-readable code which cannot be conveniently read by a human. The machine-readable code can include, but is not limited to, a quick response (QR) code and/or other type of barcode, audio sequence, light sequence, or image. The machine-readable code stores some or all of the configuration dataset's information for reading or scanning by mobile communication devices.

The second radio can periodically re-perform the machine-readable code generation process of blocks 408 and 410. Accordingly, method 400 comprises optional block 412 in which it returns to 406 or 408. In this regard, it should be noted that the machine-readable code has a temporal component, i.e., the time of day. As such, the machine-readable code may be considered valid for only a certain period of time, and therefore may need to be re-generated before or upon expiration of the certain period of time (e.g., X second, minutes, hours, or days. X is an integer). For example, in some scenarios, the machine-readable code for the second radio is re-generated every one or ten seconds. The present solution is not limited in this regard.

In next block 414, the configuration dataset in the second machine-readable data format is presented on a display screen of the second radio or a display screen of a peripheral (e.g., peripheral 130 of FIG. 1). The peripheral can include, but is not limited to, a keyboard display unit (KDU) and/or a mobile communication device. For example, a QR code is presented on a display screen of the second radio, a display screen of a KDU, and/or a display screen of the first mobile communication device. The present solution is not limited in this regard.

The first mobile computing device performs operations in block 416 to scan or otherwise read the configuration dataset in the second machine-readable data format. The scanning or reading can be achieved using a camera, a NFC, an ATAK data packet over a mobile ad hoc network (MANET), and/or an audio modem. For example, the first mobile communication device captures and processes an image of a QR code displayed on the screen of the second radio or peripheral. The present solution is not limited to the particulars of this example. The format of the configuration dataset is converted by the first mobile communication device in block 418 from the second machine-readable data format to a third machine-readable data. The third machine-readable format comprises a digital data format. The result of this conversion is referred to herein as digital configuration data.

The digital configuration data is stored in a datastore (e.g., datastore 110 of FIG. 1 and/or memory 312 of FIG. 3) along with a timestamp, as shown by block 420. It should be noted that the digital configuration data has two temporal data components—the time of day specifying when the configuration dataset was generated by the second radio, and the timestamp specifying when the digital configuration data is stored by the first mobile communication device. These two temporal data components allow the first mobile communication device to subsequently cause the first and second radios to be synchronized in time regardless of when the machine-readable code was generated by the second radio.

Accordingly, method 400 continues with optional block 422 in which the first mobile computing device optionally updates the time of day information in the digital configuration data for the second radio based on a current time of day, the time of day specified in the digital configuration data, and the timestamp that was stored so as to be associated with the digital configuration data. For example, the radio configuration setting was generated by the second radio at 10:59 AM, and the machine-readable code was captured by the first mobile at 11:00 AM. At 11:10 AM, the first mobile communication device accesses the digital configuration data associated with the second radio and determines that ten minutes has lapsed since the corresponding radio configuration dataset was generated. So, the time of day in the digital configuration data is adjusted forwards by ten minutes, i.e., from 10:59 AM to 11:09 AM. The present solution is not limited to the particulars of this example. This time of day updating feature of the present solution allows for synchronization components to be coordinated across radios.

In block 424, the first mobile computing device or another second mobile communication device (e.g., mobile communication device 104₂ of FIG. 1) performs operations to compare the digital configuration data associated with the second radio to the digital configuration data associated with one or more of the first radios. The comparison operations can involve parsing corresponding configuration information from the two sets of digital configuration data and comparing the same to each other to determine whether a match exists according to defined criteria. Different criteria may be used for different types of configuration data. In this regard, it should be understood that some types of configuration data associated with the second radio should exactly match the corresponding data associated with the first radio, while other types of configuration data associated with the second radio should be different from the corresponding data associated with the first radio. There may also be types of configuration data that should match by a certain amount. For example, the times of day in the two sets of digital configuration data should be the same or the difference therebetween should not exceed a threshold value Y (e.g., 10 minutes). Y in any integer. The threshold value Y may be different and selected based on the communication mode of the second radio. The communication modes, waveform types, key identifier or index, frequency, and frequency hopping parameters should be the same in the two sets of digital configuration data. The internet protocol (IP) addresses, station names, and media access control (MAC) addresses should be different in the two sets of digital configuration data. The present solution is not limited to the particulars of this example.

When the matching and non-matching criteria are met [426:YES], method 400 continues to block 428 where a notification of configuration compatibility is output from the first or second mobile communication device. Method 400 may then return to block 404.

When the matching and/or non-matching criteria is(are) not met [426:NO], method 400 continues to block 430 where the first or second mobile communication device optionally generates and outputs a notification of the configuration compatibility issue and/or a recommendation for resolving the configuration compatibility issue. The recommendation may be generated using a trained machine learning model. The trained machine learning model can include, but is not limited to, a neural network. The inputs to the trained machine learning model can include, but are not limited to, digital configuration data and/or environmental sensor data. The machine learning model may be trained to, for example, generate recommended parameter setting that are to be adjusted in the first and/or second radios. For example, the machine learning model generates and outputs a recommendation for the first radio and/or the second radio to change its(their) waveform type(s). The present solution is not limited to the particulars of this example.

Next in 432, the first or second mobile communication device performs operations to reconcile the differences in the radio configurations. The operations of block 432 can include, but is not limited to: (i) selecting one of the sets of the digital configuration data based on a user identifier of the first mobile communication device, a user identifier of the second mobile communication device, a user identifier of the first radio, a user identifier of the second radio, user assigned priorities, radio assigned priorities, a location of the first mobile communication device, a location of the second mobile communication device, a location of the first radio, a location of the second radio, spectral sensing information, sensed environmental data, radio network health information, and/or radio proximity; (ii) considering the selected set of digital configuration data as being the reference digital configuration data; and (iii) either (a) modifying the other non-selected set(s) of digital configuration data based on the reference configuration data in a manner that resolves the radio communication compatibility issue(s) or (b) generating a fully or partially new digital configuration data based on the reference digital configuration data. For example, in some scenarios with regard to the new digital configuration data, the new digital configuration data could include the reference digital configuration data except for the encryption information and/or waveform information which is changed given the current locations of the first and/or second radios. In other scenarios, the digital configuration data of the second radio and one of the first radios are selectively combined to form the new configuration data. For example, the communication mode of the second radio is used in the new configuration data, but the waveform type of the first radio is used in the new configuration data. The present solution is not limited to the particulars of these examples/scenarios.

In 434, the configuration settings of the first radio(s) and/or second radio is(are) changed in accordance with the modified digital configuration data or the new digital configuration data. This re-configuration of the radio(s) may be performed manually by the radio user(s) or automatedly by the radio(s). For example, the channel(s) and/or frequency of the radio may be manually or autonomously changed. The present solution is not limited to the particulars of this example. Subsequently, method 400 continues to block 436 where it ends or other operations are performed.

FIG. 5 provides a flow diagram of an illustrative method 500 for re-configuring at least one of a plurality of radios (e.g., radios 102 of FIG. 1) which may be in the field. Method 500 begins with 502 and continues with 504 where a mobile communication device (e.g., mobile communication device 104$_1$, 104$_2$ of FIG. 1, and/or 300 of FIG. 3) obtains a machine-readable code (e.g., machine readable code 254 of FIG. 2) from a first radio (e.g., radio 102$_1$ or 102$_N$ of FIG. 1) in the field. The machine-readable code stores digital configuration data (e.g., digital configuration data 256 of FIG. 2) for the first radio. The digital configuration data can include, but is not limited to, a radio identification, pre-set system settings, pre-set waveform settings, and the time of day indicating when the digital configuration data was generated by the first radio. Operations of block 504 can involve reading or scanning the machine-readable code displayed on a display screen of the first radio, a display screen of a peripheral device (e.g., peripheral device 130 of FIG. 1) connected to the first radio, or a display screen of another mobile communication device. The machine-readable code can include, but is not limited to, a QR code.

In next block 506, the mobile communication device performs operations to convert the machine-readable code into first digital configuration data. Any known or to be known technique for converting a machine-readable code (e.g., a QR code) to digital data can be used herein. The first digital configuration data includes a time of day at which the digital configuration data was generated by the first radio. The mobile communication device associates a timestamp with the first digital configuration data, as shown by block 508.

Block 510 involves updating the time of day contained in the first digital configuration data based on the time stamp. For example, the time of day is advanced forwards based on the difference between the time of day and the time stamp. The present solution is not limited to the particulars of this example.

Next in 512, the mobile communication device compares the first digital configuration data, with the updated time of day, to second digital configuration data associated with a second radio (e.g., radio 102$_2$ or 102$_{N-1}$ of FIG. 1) in the field. Based on results of this comparison, the mobile communication device performs operations in block 514 to detect whether a pre-defined criteria is met. The pre-defined criteria may specify that (a) at least a first type of configuration data associated with the first radio should match corresponding configuration data associated with the second radio, (b) at least a second type of configuration data associated with the first radio should be different from the corresponding configuration data associated with the first radio, and/or (c) at least a difference between a third type of configuration data associated with the first and second radios should fall within a defined range of values. The first type of configuration data can include, but is not limited to, a communication mode, a waveform type, a key identifier or index, a frequency, a frequency hopping parameter, or a time of day. The second type of configuration data can include, but is not limited to, an internet protocol address, a station name, a media access control address, or a power level. The third type of configuration data can include, but is not limited to, a time of day.

In block 516, the mobile communication device performs operations to reconcile a communication incompatibility issue between the first or second radios. The reconciliation may be based on results from the comparison performed in block 512 and/or result from the detection in block 514. The operations of block 516 can involve: selecting one of the first digital configuration data and the second digital configuration data to be a reference digital configuration data; and either (a) modifying a non-selected one of the first and second digital configuration data based on the reference configuration data in a manner that resolves the communication incompatibility issue, or (b) generating new digital configuration data based on the reference digital configuration data. The first or second digital configuration data may be selected based on one or more of a user identifier of the mobile communication device, a user identifier of another mobile communication device, a user identifier of the first radio, a user identifier of the second radio, user assigned priorities, radio assigned priorities, a location of the mobile communication device, a location of another mobile communication device, a location of the first radio, a location of the second radio, spectral sensing information, sensed environmental data, radio network health information, and a radio proximity. Subsequently, method 500 continues to 518 where it ends or other operations are performed.

FIG. 6 provides a flow diagram of another method 600 for re-configuring at least one of a plurality of radios. Method 600 begins with block 602 and continues with the operations of blocks 604-616. These operations comprise: obtaining a machine-readable code by a mobile communication device from a first radio of the plurality of radios (wherein the machine-readable code based on a first digital configuration data and a time reference for the first radio); converting, by the mobile communication device, the machine-readable code into the first digital configuration data and the time reference; associating, by the mobile communication device, a time of day of the mobile communication device with the first digital configuration data and the time reference; updating, by the mobile communication device, the time reference on the mobile communication device based on the time of day of the mobile communication device; comparing, by the mobile communication device, the first digital configuration data, with the updated time reference, to second digital configuration data associated with a second radio of the plurality of radios in the field; detecting whether a pre-defined criteria is met based on the results of the comparison; and/or performing operations, by the mobile communication device, to reconcile a communication incompatibility issue between the first or second radios based on results of the comparing. Subsequently, method 600 continues to block 618 where it ends or other operations are performed (e.g., return to block 602).

The first digital configuration data can include, but is not limited to, a radio identification, pre-set system settings, pre-set waveform settings, and the time of day indicating when the first digital configuration data was generated by the first radio. The operations of block 604 may comprises reading or scanning the machine-readable code displayed on a display screen of the first radio, a display screen of a peripheral device connected to the first radio, or a display screen of another mobile communication device.

The pre-defined criteria of block 614 may specify that at least a first type of configuration data associated with the first radio should match corresponding configuration data associated with the second radio, while at least a second type of configuration data associated with the first radio should be different from the corresponding configuration data associated with the first radio. The first type of configuration data may comprise a communication mode, a waveform type, a key identifier or index, a frequency, a frequency hopping parameter, or a time of day. The second type of configuration data may comprise an internet protocol address, a station name, a media access control address, or a power level. The pre-defined criteria may further specify that at least a difference between a third type of configuration data associated with the first and second radios should fall within a defined range of values. The third type of configuration data may comprise a time of day.

The operations of block 616 may include, but are not limited to: selecting one of the first digital configuration data and the second digital configuration data to be a reference digital configuration data; and either (a) modifying a non-selected one of the first and second digital configuration data based on the reference digital configuration data in a manner that resolves the communication incompatibility issue, or (b) generating new digital configuration data based on the reference digital configuration data. The first or second digital configuration data may be selected based on one or more of a user identifier of the mobile communication device, a user identifier of another mobile communication device, a user identifier of the first radio, a user identifier of the second radio, user assigned priorities, radio assigned priorities, a location of the mobile communication device, a location of another mobile communication device, a location of the first radio, a location of the second radio, spectral sensing information, sensed environmental data, radio network health information, and a radio proximity.

Figure 7:
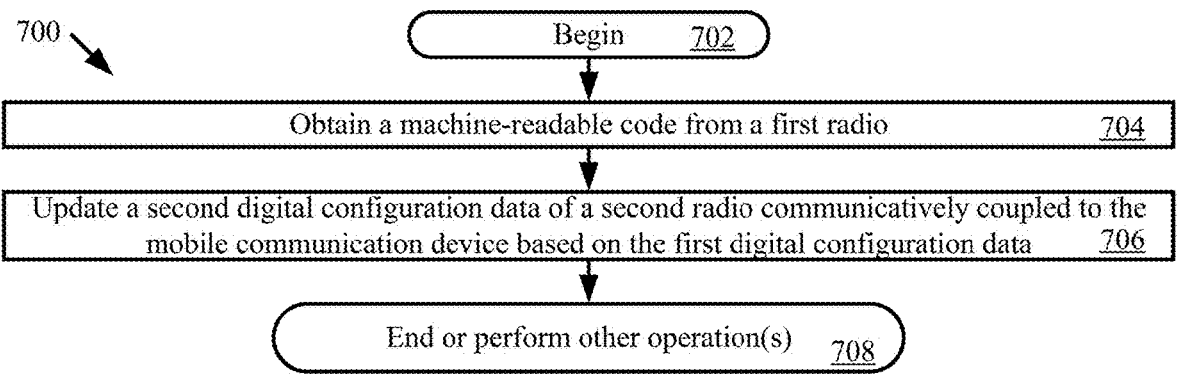
FIG. 7 provides a flow diagram of another illustrative method for configuring or re-configuring at least one of a plurality of radios.

FIG. 7 provides a flow diagram of an illustrative method 700 for (re)configuring at least one of a plurality of radios (e.g., radios 102 of FIG. 1). Method 700 begins with 702 and continues to 704 where a mobile communication device (e.g., mobile communication device 104₂ of FIG. 1) obtains a machine-readable code from a first radio (e.g., radios 102_{N-1} of FIG. 1) of the plurality of radios. The machine-readable code may be obtained by reading or scanning the machine-readable code displayed on a display screen of the first radio, a display screen of a peripheral device connected to the first radio, or a display screen of another mobile communication device. The machine-readable code may be based on first digital configuration data for the first radio.

The first digital configuration data can include, but is not limited to, an operational frequency, a time, a bandwidth, modulation coding data, forward error correction data, differential encoding data, cypher mode, a TRANSEC key, security key identifier, and a spreading code. The term "TRANSEC" refers to transmission security (e.g., hopset). The first digital configuration data further may also include a radio identification, pre-set system settings, and/or pre-set waveform settings. The time may comprise a time of day indicating when the first digital configuration data was generated by the first radio. The operational frequency is distinct from a band (e.g., WiFi—2.4 GHz) and represents the frequency at which the mobile communication is configured to operate for wireless communications.

Next in block 706, the mobile communication device updates a second digital configuration data of a second radio (e.g., radios 102_N of FIG. 1) communicatively coupled to the mobile communication device based on the first digital configuration data. The updating may cause an operational frequency, a time, a bandwidth modulation coding data, forward error correction data, differential encoding data, cypher mode, a TRANSEC key, security key identifier, and a spreading code of the second radio to be changed to match the corresponding portion of the first digital configuration data of the first radio. For example, one or more of the following results from the updating: the operational frequency of the second radio is updated to match the operational frequency of the first radio; a time of the second radio is updated to match a time of the first radio; a bandwidth of the second radio is updated to match a bandwidth of the first radio; a modulation coding scheme of the second radio is updated to match a modulation coding scheme of the first radio; forward error correction of the second radio is updated to match the forward error correction of the first radio; differential encoding of the second radio is updated to match the differential encoding of the first radio; a cypher mode of the second radio is updated to match the cypher mode of the first radio; a TRANSEC key of the second radio is updated to match the TRANSEC key of the first radio; a security key identifier is updated to match the security key identifier of the first radio; and/or a spreading code of the second radio is updated to match the spreading code of the first radio. Subsequently, method 700 continues to block 708 where it ends or other operations are performed.

In some scenarios, the operations of block 706 may involve detecting whether a pre-defined criteria is met (as part of said updating or prior to said updating). The pre-defined criteria may specify that at least a first type of configuration data associated with the first radio should match corresponding configuration data associated with the second radio, while at least a second type of configuration data associated with the first radio should be different from the corresponding configuration data associated with the first radio. The first type of configuration data can include, but is not limited to, a communication mode, a waveform type, a key identifier or index, a frequency, a frequency hopping parameter, or a time of day. The second type of configuration data can include, but is not limited to, comprises an internet protocol address, a station name, a media access control address, or a power level. The pre-defined criteria may further specify that at least a difference between a third type of configuration data associated with the first and second radios should fall within a defined range of values. The third type of configuration data can include, but is not limited to, a time of day.

In those or other scenarios, the updating involves: selecting one of the first digital configuration data and the second digital configuration data to be a reference digital configuration data; and either (a) modifying a non-selected one of the first and second digital configuration data based on the reference digital configuration data in a manner that resolves the communication incompatibility issue, or (b) generating new digital configuration data based on the reference digital configuration data. The first or second digital configuration data may be selected based on one or more of a user identifier of the mobile communication device, a user identifier of another mobile communication device, a user identifier of the first radio, a user identifier of the second radio, user assigned priorities, radio assigned priorities, a location of the mobile communication device, a location of another mobile communication device, a location of the first radio, a location of the second radio, spectral sensing information, sensed environmental data, radio network health information, and a radio proximity.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

Without excluding further possible embodiments, certain example embodiments are summarized in the following clauses:

Clause 1: A method for re-configuring at least one of a plurality of radios, comprising: obtaining a machine-readable code by a mobile communication device from a first radio of the plurality of radios, the machine-readable code based on first digital configuration data for the first radio, the digital configuration data comprising at least one of an operational frequency, a time, a bandwidth, modulation coding data, forward error correction data, differential encoding data, cypher mode, a TRANSEC key, security key identifier, and a spreading code; and updating, by the mobile communication device, a second digital configuration data of a second radio communicatively coupled to the mobile communication device based on the first digital configuration data.

Clause 2: The method according to Clause 1, wherein said updating causes an operational frequency, a time, a bandwidth, modulation coding data, forward error correction data, differential encoding data, cypher mode, a TRANSEC key, security key identifier and or a spreading code of the second radio to be changed to match the corresponding portion of the first digital configuration data of the first radio.

Clause 3: The method according to any of the preceding clauses, wherein the first digital configuration data further comprises a radio identification, pre-set system settings, and pre-set waveform settings.

Clause 4: The method according to any of the preceding clauses, wherein the time comprises a time of day indicating when the first digital configuration data was generated by the first radio.

Clause 5: The method according to any of the preceding clauses, wherein said obtaining the machine-readable code comprises reading or scanning the machine-readable code displayed on a display screen of the first radio, a display screen of a peripheral device connected to the first radio, or a display screen of another mobile communication device.

Clause 6: The method according to any of the preceding clauses, further comprising detecting whether a pre-defined criteria is met (as part of said updating or prior to said updating), wherein the pre-defined criteria specifies that at least a first type of configuration data associated with the first radio should match corresponding configuration data associated with the second radio, while at least a second type of configuration data associated with the first radio should be different from the corresponding configuration data associated with the first radio.

Clause 7: The method according to any of the preceding clauses, wherein said first type of configuration data comprises a communication mode, a waveform type, a key identifier or index, a frequency, a frequency hopping parameter, or a time of day.

Clause 8: The method according to any of the preceding clauses, wherein said second type of configuration data comprises an internet protocol address, a station name, a media access control address, or a power level.

Clause 9: The method according to any of the preceding clauses, wherein the pre-defined criteria further specifies that at least a difference between a third type of configuration data associated with the first and second radios should fall within a defined range of values.

Clause 10: The method according to any of the preceding clauses, wherein the third type of configuration data comprises a time of day.

Clause 11: The method according to any of the preceding clauses, wherein said updating comprises: selecting one of the first digital configuration data and the second digital configuration data to be a reference digital configuration data; and either (a) modifying a non-selected one of the first and second digital configuration data based on the reference digital configuration data in a manner that resolves the communication incompatibility issue, or (b) generating new digital configuration data based on the reference digital configuration data.

Clause 12: The method according to any of the preceding clauses, wherein said one of the first and second digital configuration data is selected based on one or more of a user identifier of the mobile communication device, a user identifier of another mobile communication device, a user identifier of the first radio, a user identifier of the second radio, user assigned priorities, radio assigned priorities, a location of the mobile communication device, a location of another mobile communication device, a location of the first radio, a location of the second radio, spectral sensing information, sensed environmental data, radio network health information, and a radio proximity.

Clause 13: A system, comprising: a processor configured to; and/or a non-transitory computer-readable storage medium comprising programming instructions that are configured to cause the processor to implement a method for re-configuring at least one of a plurality of radios in the field, wherein the programming instructions comprise instructions to: obtain a machine-readable code from a first radio of the plurality of radios, the machine-readable code based on first digital configuration data for the first radio, the digital configuration data comprising at least one of an operational frequency, a time, a bandwidth, modulation coding data, forward error correction data, differential encoding data, cypher mode, a TRANSEC key, security key identifier, and a spreading code; and update a second digital configuration data of a second radio communicatively coupled to the mobile communication device based on the first digital configuration data.

Clause 14: The system according to Clause 13, wherein an update of the second digital configuration data causes an operational frequency, a time, a bandwidth, modulation coding data, forward error correction data, differential encoding data, cypher mode, a TRANSEC key, security key identifier, and or a spreading code of the second radio to be changed to match the corresponding portion of the first digital configuration data of the first radio.

Clause 15: The system according to any of the preceding system clauses, wherein the first digital configuration data further comprises a radio identification, pre-set system settings, and pre-set waveform settings.

Clause 16: The system according to any of the preceding system clauses, wherein the machine-readable code is obtained by reading or scanning the machine-readable code displayed on a display screen of the first radio, a display screen of a peripheral device connected to the first radio, or a display screen of another mobile communication device.

Clause 17: The system according to any of the preceding system clauses, wherein the programming instructions further comprise instructions to detect whether a pre-defined criteria is met (as part of said updating or prior to said updating), wherein the pre-defined criteria specifies that at least a first type of configuration data associated with the first radio should match corresponding configuration data associated with the second radio, while at least a second type of configuration data associated with the first radio should be different from the corresponding configuration data associated with the first radio.

Clause 18: The system according to any of the preceding system clauses, wherein said first type of configuration data comprises a communication mode, a waveform type, a key identifier or index, a frequency, a frequency hopping parameter, or a time of day.

Clause 19: The system according to any of the preceding system clauses, wherein said second type of configuration data comprises an internet protocol address, a station name, a media access control address, or a power level.

Clause 20: The system according to any of the preceding system clauses, wherein the pre-defined criteria further specifies that at least a difference between a third type of configuration data associated with the first and second radios should fall within a defined range of values, and the third type of configuration data comprises a time of day.

Clause 21: A method for re-configuring at least one of a plurality of radios, comprising: obtaining a machine-readable code by a mobile communication device from a first radio of the plurality of radios (wherein the machine-readable code based on a first digital configuration data and a time reference for the first radio); converting, by the mobile communication device, the machine-readable code into the first digital configuration data and the time reference; associating, by the mobile communication device, a time of day of the mobile communication device with the first digital configuration data and the time reference; updating, by the mobile communication device, the time reference on the mobile communication device based on the time of day of the mobile communication device; comparing, by the mobile communication device, the first digital configuration data, with the updated time reference, to second digital configuration data associated with a second radio of the plurality of radios in the field; and performing operations, by the mobile communication device, to reconcile a communication incompatibility issue between the first or second radios based on results of the comparing.

Clause 22: The method according to any of the Clause 21 and/or another of the other preceding method clauses, wherein the first digital configuration data comprises a radio identification, pre-set system settings, pre-set waveform settings, and the time of day indicating when the first digital configuration data was generated by the first radio.

Clause 23: The method according to any of the preceding method clauses, wherein said obtaining the machine-readable code comprises reading or scanning the machine-readable code displayed on a display screen of the first radio, a display screen of a peripheral device connected to the first radio, or a display screen of another mobile communication device.

Clause 24: The method according to any of the preceding method clauses, further comprising detecting whether a pre-defined criteria is met based on the results of said comparing, wherein the pre-defined criteria specifies that at least a first type of configuration data associated with the first radio should match corresponding configuration data associated with the second radio, while at least a second type of configuration data associated with the first radio should be different from the corresponding configuration data associated with the first radio.

Clause 25: The method according to any of the preceding method clauses, wherein said first type of configuration data comprises a communication mode, a waveform type, a key identifier or index, a frequency, a frequency hopping parameter, or a time of day.

Clause 26: The method according to any of the preceding method clauses, wherein said second type of configuration data comprises an internet protocol address, a station name, a media access control address, or a power level.

Clause 27: The method according to any of the preceding method clauses, wherein the pre-defined criteria further specifies that at least a difference between a third type of configuration data associated with the first and second radios should fall within a defined range of values.

Clause 28: The method according to any of the preceding method clauses, wherein the third type of configuration data comprises a time of day.

Clause 30: The method according to any of the preceding method clauses, wherein said performing operations to reconcile the communication incompatibility issue comprises: selecting one of the first digital configuration data and the second digital configuration data to be a reference digital configuration data; and either (a) modifying a non-selected one of the first and second digital configuration data based on the reference digital configuration data in a manner that resolves the communication incompatibility issue, or (b) generating new digital configuration data based on the reference digital configuration data.

Clause 31: The method according to any of the preceding method clauses, wherein said one of the first and second digital configuration data is selected based on one or more of a user identifier of the mobile communication device, a user identifier of another mobile communication device, a user identifier of the first radio, a user identifier of the second radio, user assigned priorities, radio assigned priorities, a location of the mobile communication device, a location of another mobile communication device, a location of the first radio, a location of the second radio, spectral sensing information, sensed environmental data, radio network health information, and a radio proximity.

Clause 32: A system, comprising: a processor configured to; and/or a non-transitory computer-readable storage medium comprising programming instructions that are configured to cause the processor to implement a method for re-configuring at least one of a plurality of radios in the field, wherein the programming instructions comprise instructions to: obtain a machine-readable code from a first radio of the plurality of radios in the field, the machine-readable code based on a first digital configuration data and a time reference for the first radio; convert the machine-readable code into the first digital configuration data and the time reference; associate a time of day of the system with the first digital configuration data and the time reference; update the time reference on the system based on the time of day of the system; and perform operations to reconcile a communication incompatibility issue between the first or second radios based on a comparison of the first digital configuration data, with the updated time of day, to second digital configuration data associated with a second radio of the plurality of radios in the field.

Clause 33: The system according to Clause 32 or any of the other preceding system claims, wherein the first digital configuration data comprises a radio identification, pre-set system settings, pre-set waveform settings, and the time of day indicating when the first digital configuration data was generated by the first radio.

Clause 34: The system according to any of the preceding system clauses, wherein the machine-readable code is obtained by reading or scanning the machine-readable code displayed on a display screen of the first radio, a display screen of a peripheral device connected to the first radio, or a display screen of another mobile communication device.

Clause 35: The system according to any of the preceding system clauses, wherein the programming instructions further comprise instructions to detect whether a pre-defined criteria is met based on the comparison, wherein the pre-defined criteria specifies that at least a first type of configuration data associated with the first radio should match corresponding configuration data associated with the second radio, while at least a second type of configuration data associated with the first radio should be different from the corresponding configuration data associated with the first radio.

Clause 36: The system according to any of the preceding system clauses, wherein said first type of configuration data comprises a communication mode, a waveform type, a key identifier or index, a frequency, a frequency hopping parameter, or a time of day.

Clause 37: The system according to any of the preceding system clauses, wherein said second type of configuration data comprises an internet protocol address, a station name, a media access control address, or a power level.

Clause 38: The system according to any of the preceding system clauses, wherein the pre-defined criteria further specifies that at least a difference between a third type of configuration data associated with the first and second radios should fall within a defined range of values.

Clause 39: The system according to any of the preceding system clauses, wherein the third type of configuration data comprises a time of day.

Clause 40: The system according to any of the preceding system clauses, wherein the communication incompatibility issue is reconciled by: selecting one of the first digital configuration data and the second digital configuration data to be a reference digital configuration data; and either (a) modifying a non-selected one of the first and second digital configuration data based on the reference configuration data in a manner that resolves the communication incompatibility issue, or (b) generating new digital configuration data based on the reference digital configuration data.

Clause 41: The system according to any of the preceding system clauses, wherein said one of the first and second digital configuration data is selected based on one or more of a user identifier of the mobile communication device, a user identifier of another mobile communication device, a user identifier of the first radio, a user identifier of the second radio, user assigned priorities, radio assigned priorities, a location of the mobile communication device, a location of another mobile communication device, a location of the first radio, a location of the second radio, spectral sensing information, sensed environmental data, radio network health information, and a radio proximity.

The breadth and scope of this disclosure should not be limited by any of the above-described example embodiments, but should be defined only in accordance with the following claims and their equivalents.

What is claimed is:

1. A method for re-configuring at least one of a plurality of radios, comprising:
   obtaining a machine-readable code by a mobile communication device from a first radio of the plurality of radios, the machine-readable code based on first digital configuration data for the first radio, the first digital configuration data comprising at least one of an operational frequency, a time, a bandwidth, modulation coding data, forward error correction data, differential encoding data, cypher mode, a TRANSEC key, security key identifier, and a spreading code; and
   updating, by the mobile communication device, a second digital configuration data of a second radio communicatively coupled to the mobile communication device based on the first digital configuration data;
   wherein said obtaining the machine-readable code comprises reading or scanning the machine-readable code displayed on a display screen of the first radio, a display screen of a peripheral device connected to the first radio, or a display screen of another mobile communication device.

2. The method according to claim 1, wherein said updating causes an operational frequency, a time, a bandwidth, modulation coding data, forward error correction data, differential encoding data, cypher mode, a TRANSEC key, security key identifier, and or a spreading code of the second radio to be changed to match the corresponding portion of the first digital configuration data of the first radio.

3. The method according to claim 1, wherein the first digital configuration data further comprises a radio identification, pre-set system settings, and pre-set waveform settings.

4. The method according to claim 1, wherein the time comprises a time of day indicating when the first digital configuration data was generated by the first radio.

5. The method according to claim 1, further comprising detecting whether a pre-defined criteria is met as part of said updating or prior to said updating, wherein the pre-defined criteria specifies that at least a first type of configuration data associated with the first radio should match corresponding configuration data associated with the second radio, while at least a second type of configuration data associated with the first radio should be different from the corresponding configuration data associated with the first radio.

6. The method according to claim 5, wherein said first type of configuration data comprises a communication mode, a waveform type, a key identifier or index, a frequency, a frequency hopping parameter, or a time of day.

7. The method according to claim 5, wherein said second type of configuration data comprises an internet protocol address, a station name, a media access control address, or a power level.

8. The method according to claim 5, wherein the predefined criteria further specifies that at least a difference between a third type of configuration data associated with the first and second radios should fall within a defined range of values.

9. The method according to claim 8, wherein the third type of configuration data comprises a time of day.

10. The method according to claim 1, wherein said updating comprises:

selecting one of the first digital configuration data and the second digital configuration data to be a reference digital configuration data; and either (a) modifying a non-selected one of the first and second digital configuration data based on the reference digital configuration data in a manner that resolves the communication incompatibility issue, or (b) generating new digital configuration data based on the reference digital configuration data.

11. The method according to claim 10, wherein said one of the first and second digital configuration data is selected based on one or more of a user identifier of the mobile communication device, a user identifier of another mobile communication device, a user identifier of the first radio, a user identifier of the second radio, user assigned priorities, radio assigned priorities, a location of the mobile communication device, a location of another mobile communication device, a location of the first radio, a location of the second radio, spectral sensing information, sensed environmental data, radio network health information, and a radio proximity.

12. A system, comprising:

a processor; and a non-transitory computer-readable storage medium comprising programming instructions that are configured to cause the processor to implement a method for reconfiguring at least one of a plurality of radios in the field, wherein the programming instructions comprise instructions to:

obtain a machine-readable code from a first radio of the plurality of radios, the machine-readable code based on first digital configuration data for the first radio, the first digital configuration data comprising at least one of an operational frequency, a time, a bandwidth, modulation coding data, forward error correction data, differential encoding data, cypher mode, a TRANSEC key, security key identifier, and a spreading code; and update a second digital configuration data of a second radio communicatively coupled to the mobile communication device based on the first digital configuration data;

wherein the machine-readable code is obtained by reading or scanning the machine-readable code displayed on a display screen of the first radio, a display screen of a peripheral device connected to the first radio, or a display screen of another mobile communication device.

13. The system according to claim 12, wherein an update of the second digital configuration data causes an operational frequency, a time, a bandwidth, modulation coding data, forward error correction data, differential encoding data, cypher mode, a TRANSEC key, security key identifier, and or a spreading code of the second radio to be changed to match the corresponding portion of the first digital configuration data of the first radio.

14. The system according to claim 12, wherein the first digital configuration data further comprises a radio identification, pre-set system settings, and pre-set waveform settings.

15. The system according to claim 12, wherein the programming instructions further comprise instructions to detect whether a pre-defined criteria is met (as part of said updating or prior to said updating), wherein the pre-defined criteria specifies that at least a first type of configuration data associated with the first radio should match corresponding configuration data associated with the second radio, while at least a second type of configuration data associated with the first radio should be different from the corresponding configuration data associated with the first radio.

16. The system according to claim 15, wherein said first type of configuration data comprises a communication mode, a waveform type, a key identifier or index, a frequency, a frequency hopping parameter, or a time of day.

17. The system according to claim 15, wherein said second type of configuration data comprises an internet protocol address, a station name, a media access control address, or a power level.

18. The system according to claim 15, wherein the predefined criteria further specifies that at least a difference between a third type of configuration data associated with the first and second radios should fall within a defined range of values, and the third type of configuration data comprises a time of day.

* * * * *